March 16, 1965 L. G. D. THOMPSON 3,173,297
PENDULUM APPARATUS FOR RELATIVE GRAVITY DETERMINATIONS
Filed Oct. 18, 1961 5 Sheets-Sheet 1

INVENTOR.
LLOYD G. D. THOMPSON
BY Wade Looney
Sherman H. Goldman
ATTORNEYS

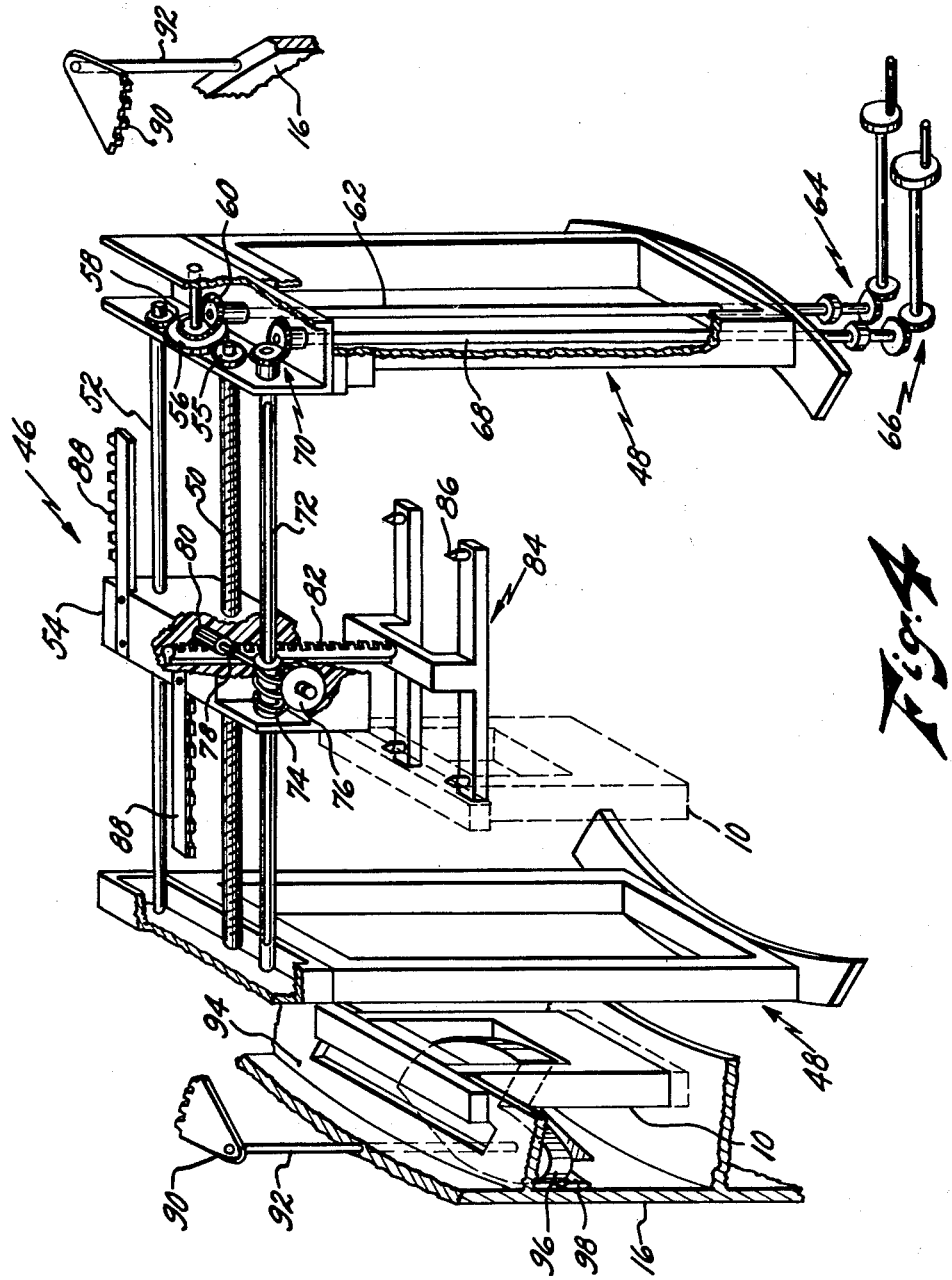

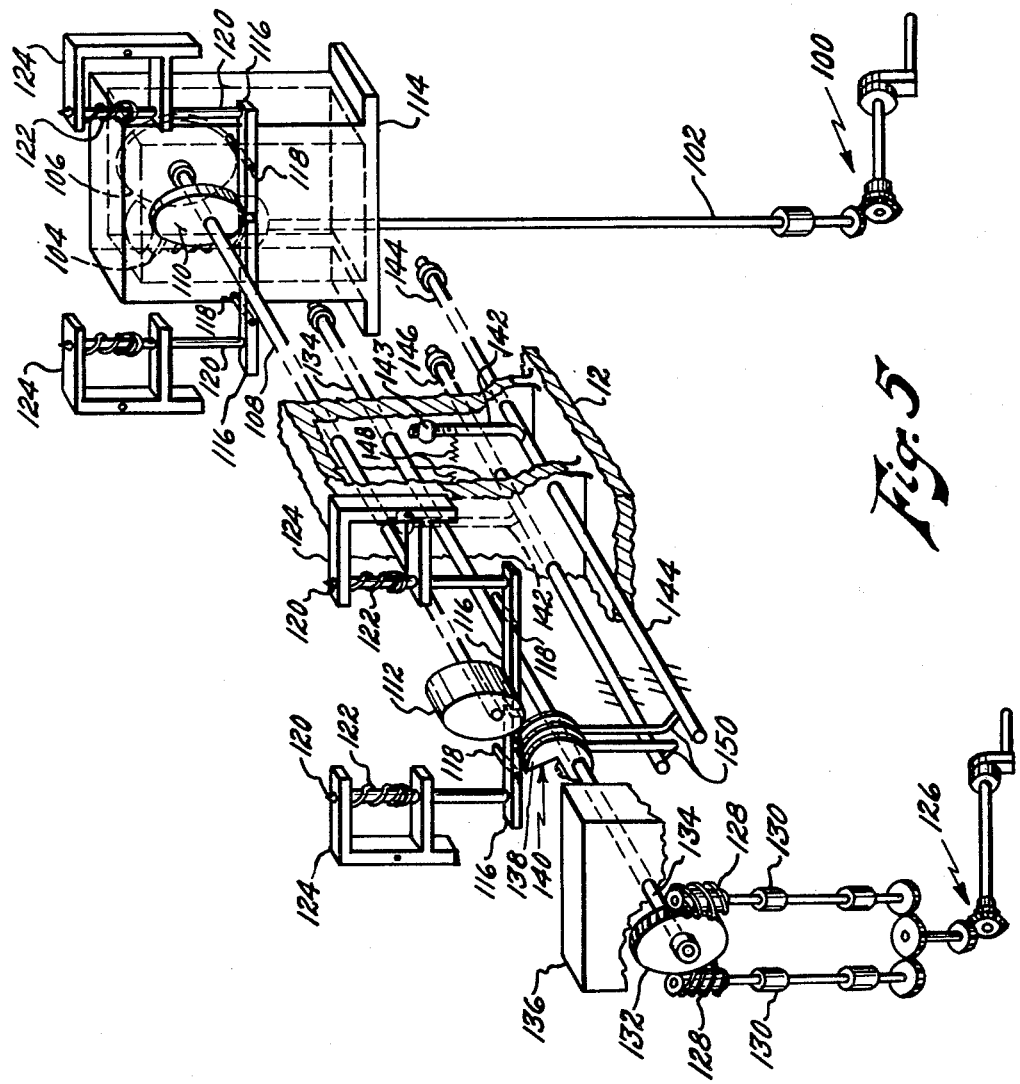

United States Patent Office 3,173,297
Patented Mar. 16, 1965

3,173,297
PENDULUM APPARATUS FOR RELATIVE
GRAVITY DETERMINATIONS
Lloyd G. D. Thompson, 15 Minute Man Lane,
Lexington 73, Mass.
Filed Oct. 18, 1961, Ser. No. 146,050
8 Claims. (Cl. 73—382)
(Granted under Title 35, U.S. Code (1952), sec. 266)

The invention described herein may be manufactured and used by or for the United States Government for governmental purposes without payment to me of any royalty thereon.

This invention relates to new and useful improvements in a pendulum apparatus used for relative measurements of the acceleration due to gravity. More specifically, it relates to a bi-pendulum apparatus in which two pendulums are swung together in anti-phase on one supporting structure in order to eliminate sway of the support and to reduce the effect of disturbing horizontal accelerations.

Equipment may be of several different types, each of which has limitations and disadvantages. In one type, two pendulums are permanently sealed in a vacuum chamber in their proper positions and can be clamped, raised, lowered, and swung for observational purposes from outside the chamber by means of vacuum sealed controls. This type of apparatus has the advantage that the pendulums are never removed or handled and the operating mechanism is never disturbed or changed. It has, however, the disadvantage that only one pair of pendulums can be used so that if something happens to one pendulum, a whole series of observations may be rendered useless and further observations may even be impossible. Another disadvantage is that if observations with a second or third pair of pendulums are to be obtained, which is the most desirable arrangement, a complete new apparatus is required for each pair of pendulums. In the other type of apparatus, one or more sets of three matched pendulums are transported independent of the vacuum chamber which is not permanently sealed. With this apparatus, one pair of pendulums is selected from one set of three and placed in the vacuum chamber which is then sealed and the observations made. A second pair of pendulums is then selected and so on. The advantage of this type of apparatus is that independent observations can be made with several different pairs of pendulums using only one apparatus. One disadvantge is that the continual handling of the pendulum and the continual disturbance and adjustment of the apparatus introduces errors in the observations, and also there is a great risk of damage. Another disadvantage is that there is a long delay between observations with different pairs of pendulums because equilibrium conditions must be achieved after each opening of the chamber.

It is, therefore, an object of this invention to provide a new and improved pendulums apparatus which has the advantages of both existing types of bi-pendulum apparatus without having their disadvantages.

Another object of this invention is to provide a pendulum apparatus which has more than two pendulums contained in and transported with a permanently sealed vacuum chamber, wherein different combinations of two of said pendulums can be selected and used for observations which permit many independent observations with different pairs of said pendulums to be made with only the one apparatus without opening the vacuum chamber.

Still another object of this invention is to provide a pendulum apparatus which has more than two pendulums contained in a permanently sealed vacuum chamber, and which permits independent observations with different pairs of said pendulums to be made with only one apparatus with minimum delay between said observations because said pendulums are contained in the vacuum chamber which is not opened and equilibrium conditions are not disturbed when said pendulums are changed.

A further object of this invention is to provide a new type of pendulums which is small in size and therefore permits a reduction in size and weight of the apparatus, and makes this new type of apparatus practical.

The invention will be more readily understood by the following description and by reference to the accompanying drawings forming a part thereof, wherein an example of the invention is shown, and wherein:

FIGURE 4 is an isometric representation of the transport mechanism which raises, transports and lowers the pendulums as well as the locking device to clamp the pendulums in a storage position; and FIGURE 5 is a schematic representation of the pendulum deflecting, centering and releasing apparatus.

Figure 1:
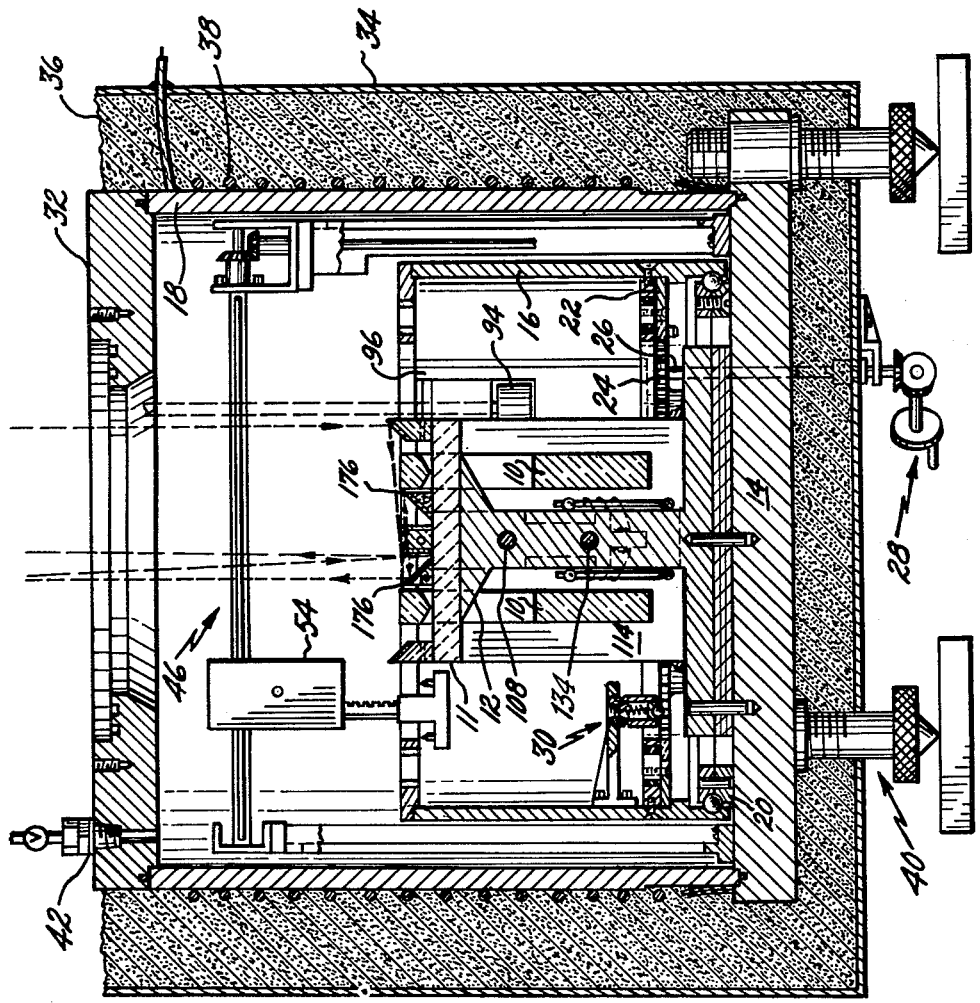
FIGURE 1 is a cross-sectional view in elevation of the pendulum containing section of the assembly of the invention.
Figure 2:
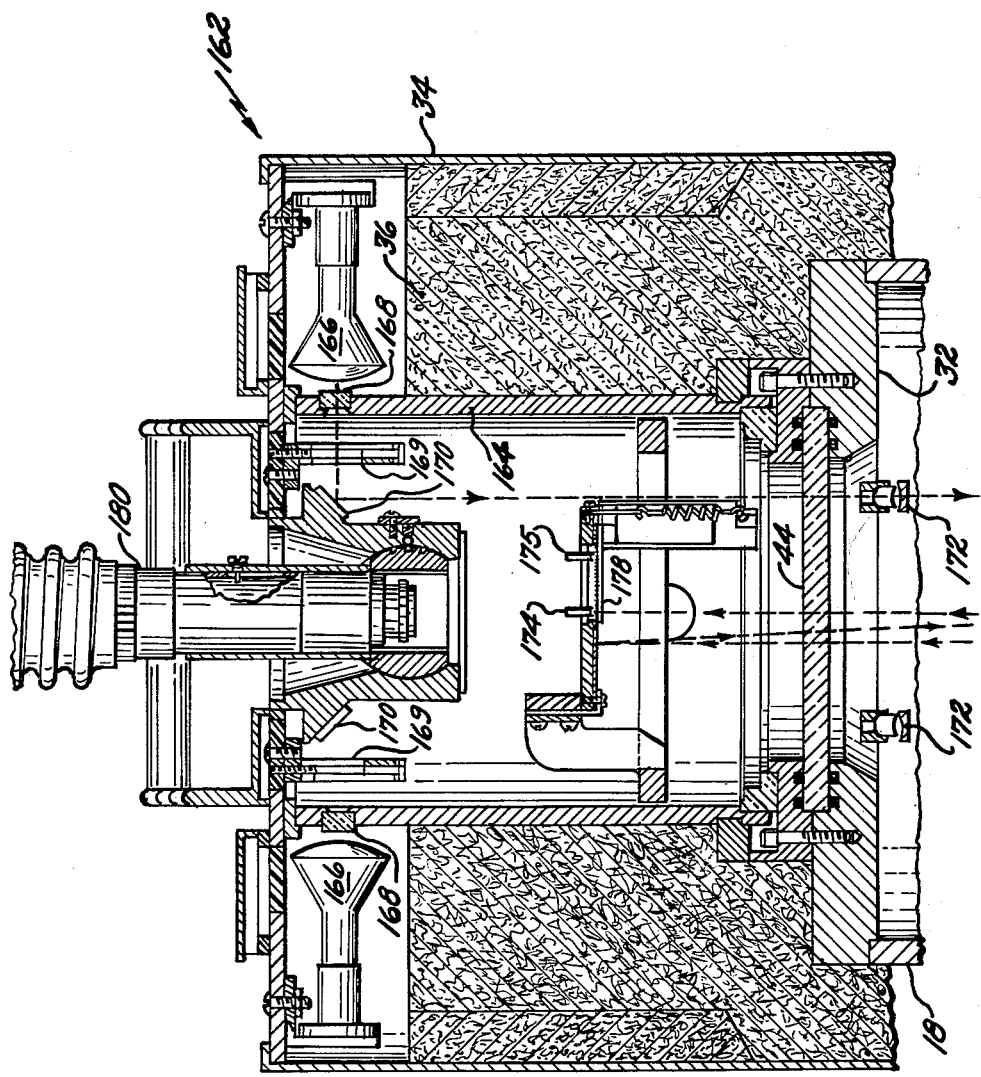
FIGURE 2 is a cross-sectional view in elevation of the optical section of the invention which is secured to the pendulum containing section of FIGURE 1.

The general design of the apparatus is shown in the combination of FIGURES 1 and 2, while details of various mechanisms are shown in the remaining figures.

Referring to FIGURE 1, which discloses the pendulum containing section of the apparatus, a pair of pendulums 10 are mounted on an H-shaped beam 12 which in turn is rigidly mounted on a circular base plate 14. The H-shaped beam rigidly supports an optical flat 11 of agate, fused quartz or chrome steel. A pair of pendulums 10 of the type disclosed in my copending application, Serial No. 146,048, filed on even date herewith, straddle the optical flat 11 at either end with the knife edges of the pendulums resting on the optical flat surface. In this manner, the pendulums swing in the generally rectangular spaces defined by the H-beam and are separated from each other by the center member of the H-beam. Thus, interference which might be caused by air movement between the pendulums is eliminated. A rotatable cylinder 16 surrounds the H-beam structure and is located within a concentric cylinder 18 which is fixed to the circular base plate 14. The larger cylinder 18 is vacuum sealed, for example, by means of an O-ring seal to the base plate.

Rotation of the cylinder 16 is achieved by means of its attachment to a ball bearing support 20 fixed to the base plate and an internal ring gear 22 secured to the inner wall of rotatable cylinder 16. A spur gear 24 is connected to operate ring gear 22 by means of a shaft 26 connected with a crank mechanism generally shown at 28. Thus, rotation of the crank mechanism transmits the rotary motion to gear 24 and thence to ring gear 22 to rotate cylinder 16. Optical viewing of the indexing of the cylinder is possible; however, in order to index the cylinder 16, a spring biased detent 30 engages recesses in the ring gear 22.

A cover plate 32 is provided in vacuum sealed relationship to outer cylinder 18 to form a closure for the top of the device and has a circular window 44 sealed in a recess in said cover plate in order to allow for viewing of the interior of the pendulum case, and to permit entry of the light from an optical tube (FIG. 2) which is aligned with said window. The mechanism thus far described is surrounded on its sides and bottom with insulating material 36 which is contained by an outer wall 34.

Figure 3:
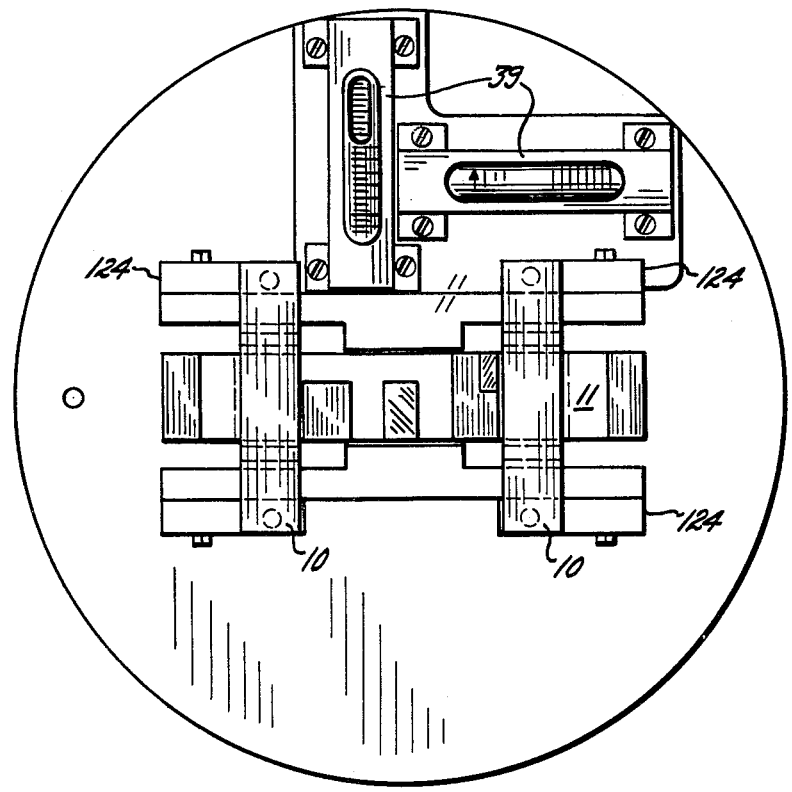
FIGURE 3 is a plan view of the pendulum containing section of the invention as it would be seen through the optical tube.

In order to achieve accurate gravity measurements, the inside of the pendulum containing case must be maintained at a constant temperature; therefore, heating coils 38 are provided between the insulating material 36 and outer cylinder 18. Since the accuracy of the device is also dependent upon leveling of the device, leveling feet 40 are provided at the bottom of the device in threaded portions of base plate 14. In addition, leveling bubbles 39, as shown in FIGURE 3, are provided on the H-beam structure to facilitate the adjustment of leveling feet 40. Provision for the evacuation of the pendulum container is achieved with inlet fitting 42 in cover plate 32 and is normally connected with a conventional vacuum pump (not shown).

The transport mechanism 46 for the pendulums is shown most clearly in FIGURE 4 and provides for lateral movement of the pendulums to and from the optical flat 11. Frameworks 48 are positioned on opposite sides of the H-beam 12 and are fixedly mounted on base plate 14.

The lateral positioning mechanism utilizes a transverse guide screw which comprises a threaded rod 50 and a guide rod 52 for movement of a transverse block 54. The transverse block 54 is internally threaded such that it is in driving engagement with the threaded guide screw 50. A spur gear 55 is mounted on the end of threaded rod 50 at its junction with support bracket 48 and a spur gear 56 on a shaft carrying bevel gear 58 is in driving engagement with gear 55. A second bevel gear 60 in engagement with gear 58 is arranged to rotate a shaft 62 extending through framework 48 such that it is connected with a crank and bevel gear assembly 64. Operation of the crank and bevel gear assembly 64, therefore, causes rotation of the transverse guide screw 50 to cause a transverse movement of transverse block 54.

An arrangement is also provided, as shown in FIGURE 4, for raising and lowering the pendulums. A crank 66 with a bevel gear arrangement is arranged to operate a vertical shaft 68 through the framework 48 to operate a pair of bevel gears 70. One of the bevel gears operates a splined shaft 72 which extends through the transverse block 54 and is supported by framework 48. Mounted for slidable movement along splined shaft 72 is a worm 74 which is contained within the transverse block. A worm gear 76 in mesh with worm 74 actuates a shaft 78 mounted in the transverse block 54 and contains a pinion gear 80 fixed on said shaft. A rack 82, to which is affixed an H-shaped lifter 84, is operated by the pinion gear 80. The H-shaped lifter 84 has on the arms thereof locating pins 86 for engagement with recesses (not shown) in the knife edge block of the pendulums. From this arrangement it can be seen that rotation of the crank mechanism 66 causes a rotation of 68, 70 and 72 which in turn causes the worm 74 to operate its mating gear 76 and, therefore, pinion 78 to cause vertical movement of the rack 82 through the transverse block 54.

Mounted on the transverse block 54 are a pair of racks 88 which are adapted to engage sectors 90 which are mounted on shafts 92 extending from wall 16. These racks engage the sectors when the transverse movement of 54 moves the sectors adjacent the wall 16 on which the pendulums 10 are mounted in brackets or nests 94. The sectors, through shaft 92, operate latches 96 which are biased by a spring 98. The sectors and latches are biased in the closed position to clamp the pendulum 10 in the nest or bracket 94. The latch 96 is a sector which, under the action of the biasing spring 98, engages with the hollow interior of the pendulum 10. A very slight movement of sector 90 causes a release of the latch such that H-member 84 has time to withdraw the pendulum before the latch again biases to closed position.

The mechanism for receiving the pendulums from the transport mechanism of FIGURE 4 is shown in FIGURE 5. This arrangement allows for the raising and lowering of the pendulum from and to the optical flat 11 and also for setting the pendulums 10 in motion in order to take a gravity measurement.

A crank and gear arrangement 100 drives a shaft 102 having a worm 104 located at the end thereof. A worm gear 106 is operated by the worm 104 and is arranged to drive a shaft 108 having cams 110 and 112 fixedly mounted thereon. A bearing block 114 fixedly mounted on the bottom flange of the H-beam member 12 supports the mechanism thus far described. The cams 110 and 112 produce a movement of pairs of horizontal links 116 which pivot about shafts 118 mounted in either bearing blocks 114 or 136 or in the H-member 12. The horizontal linkages are arranged to bias vertical members 120 in order to effect engagement of these members with the pendulums. Springs 122 bias the vertical members 120 in a downward direction from their F-frame mountings 124, which are fixed relative to the H-frame 12 as shown more clearly in FIGURE 3. Links 116 oppose the action of the spring to raise the pendulums.

A crank and gear arrangement shown at 126 is utilized to operate the pendulum deflecting section. Crank arrangement 126 operates worms 128 through clutches 130 in order to effect operation of worm gear 132 by cranking in either direction. Gear 132 is mounted on shaft 134 to effectuate rotation thereof through bearing block 136, which is mounted in a manner similar to that of bearing block 114, in order to operate a cam 138 which has a sector 140 removed. The striker arms 142 with rubber tip 143 thereon are mounted on shafts 144 and 146 through the H-member and are biased by springs 148 into a neutral position. A pair of crank arms 150 on shafts 144 and 146 are biased against cam 138 by virtue of the action of the biasing springs 148. Rotation of the crank 126, therefore, operates cam 138 to cause a movement of crank arms 150 and, consequently, a movement of the striker arms 142 at the center of percussion of the pendulums. Upon reaching the portion 140 of cam 138 crank arms 150 are allowed to assume their neutral position and the pendulums may swing freely.

The apparatus thus far described is utilized to measure the period of a fictitious pendulum rather than the period of each individual pendulum. The period of the fictitious pendulum is the mean period of the two individual pendulums utilized at a particular time. The period is measured directly by reflecting a beam of light from one pendulum to the other and then to a detector or recording device. Since the pendulum swings 180° out of phase, any disturbing acceleration affecting both pendulums in the same sense is eliminated in the oscillation of the light beam representing the motion of the fictitious pendulum.

The optical system 162 shown in FIGURE 2 is attached to the cover plate 32 of the mechanism shown in FIGURE 1 and at the bottom of FIGURE 2. The optical tube 164 is located over glass window 44 and contains the mechanism for timing the pendulums and checking the arc of swing. The outer wall 34 of the pendulum-containing section extends upwardly with the insulating material to encompass the side of optical tube 164. The entire optical tube may be arranged to have its own outer wall and insulation thereby making it more easily removable from the lower section. When the optical tube is removed an insulated cover may be provided to avoid heat loss.

At the top of the space between the outer wall 34 and the optical tube 164 there are located duplicate light sources 166 which would be connected to a suitable source of electrical energy. A lens or glass window 168 is provided for each light source in the optical tube to allow light passage through a slit 169 onto a mirror 170 for reflection of the light beam down through window 44 onto a mirror surface (see FIGURE 1) on the pendulum which might be of the type described in my aforementioned copending application. An additional lens 172 may be mounted below or alternatively constructed as a part of window 44 to focus the beam of light.

It should be noted that the length of the optical tube 164 depends on the required velocity of the reflected light beam passing a photocell 174 to give a suitably sharp pulse for amplifying and shaping to a trigger pulse. The required velocity depends on the optical system, i.e., the sharpness, width, intensity of the image at the photocell and the image characteristics. Thus, the lower the required velocity the shorter the optical tube. The optical system described relative to the light source lens and mirror arrangement of elements 166, 168, 170 and 172 are duplicated such that one system may be used for checking and setting the starting deflection amplitude of each individual pendulum and the other is for checking the arc of the fictitious pendulum and measuring its period.

In order to check the deflection of each pendulum both light sources 166 emit beams through window 168, optical slits 169 and reflected from mirror 170 down through the focus lenses 172 to the mirror surfaces on the pendulums from which the beams are reflected to a pair of mirror surfaces 176 (see FIGURE 1), which are sloped so that the light beams are reflected to the zero or center line of a ground glass scale or reticle 178. When the pendulums are deflected prior to the starting of an observation, the light images move outwardly on the scale and are adjusted to a predetermined position in order to provide for the same starting amplitude for a number of observations. Although the checking was described relative to the utilization of two light sources, only one light source is necessary when a beam splitter is used.

In order to check the starting arc and in order to observe timing pulses for the fictitious pendulum only one light source is used to emit a beam of light on one pendulum from which it is reflected directly to the other and thence back to the photocell 174. A slit may be provided between the photocell and the pendulum from which the beam is reflected. When the pendulums are in their vertical positions the light source is adjusted until the reflected beam or image is exactly on the photocell and/or slit. This condition may be indicated by a meter which shows maximum output from the photocell circuit. After the beams are deflected outwardly due to the prescribed starting amplitude, the photocell 175 is adjusted to be centered on the reflected light image. This condition is also indicated by maximum output from the photocell meter. This position of photocell 175 identifies the desired amplitude of the fictitious pendulum and should remain fixed once it has been established. When the pendulums are released and oscillating, a pulse will be delivered from photocell 174 for each passage of the light image. At the start, a pulse or meter indication will also be obtained from the photocell 175 to indicate the correct starting arc.

Once the desired position of photocell 175 has been established relative to photocell 174, the proper technique for obtaining constant starting arcs of the fictitious pendulum is as follows. Deflect the pendulums and adjust their amplitudes equally to give an amplitude of the fictitious pendulum slightly greater than required. When the pendulums are released, the fictitious pendulum will have an arc slightly greater than required and the light image will swing past photocell and/or slit 175 and a double peaked pulse or meter deflection will be obtained. In a few minutes the arc will decay and the light image will just reach the photocell and/or slit 175 giving a single "long" pulse or meter deflection. This condition indicates the correct starting arc and the timing of the period is begun.

After initially adjusting a pair of pendulums to the correct equal amplitude by visually observing the reticle scale 178, any minor adjustment in the total arc of the fictitious pendulums for subsequent swings can be done by one adjustment that would vary the deflection of both pendulums by the same amount. If variations in the arc of each individual pendulum are small and the starting arc of the fictitious pendulum is kept constant, then the variations in the individual arcs do not matter since a small decrease in one arc must be accompanied by a small increase in the other arc. For these small changes in arc the change in periods are equal and opposite and the mean period (fictitious pendulum) will be constant. By maintaining a constant starting arc for all observations, no arc correction is necessary.

The output from the pulse detector of the photocell will be fed to an electronic timing system in order to provide a display of the desired information. A separate eyepiece 180 is centrally located for viewing the interior of the pendulum containing case.

Thus, it can be seen that gravity measurement apparatus is provided which allows for external adjustment and selection of pairs of pendulums without the need for breaking the vacuum or varying the temperature within the pendulum containing chamber. Throughout the device O ring and other seals and Kearfott units allow for the maintenance of vacuum conditions.

Although this invention has been described relative to a particular embodiment, it should be understood that the invention is capable of a variety of alternative embodiments or examples. For example, the cam 138 may be replaced by an adjustable linkage arrangement in order to provide variations in the amplitude through which the pendulums are to be swung.

In addition, the path of the beams of light from the light source to the photocell may be varied by utilizing fixed mirrors. I intend to be limited only by the spirit and scope of the appended claims.

I claim:

1. In a gravity measuring apparatus the combination of a sealed case, a plurality of pendulums, mounting means for supporting said pendulums around the inner periphery of said case, supporting means centrally located within said case upon which a pair of said pendulums may be simultaneously swung, externally operated means mounted on said case for transporting predetermined pairs of said pendulums to and from said support and the periphery of said case without opening said case, and means for causing relative rotation between said mounting means and said transporting means in order to align preselected pendulums with said transporting means.

2. In a gravity measuring apparatus the combination of a sealed chamber, a plurality of pendulums, mounting means for supporting said pendulums around a rotatable wall within said chamber, supporting means centrally located within said chamber upon which a pair of said pendulums may be simultaneously swung, externally operated means mounted on said case for transporting predetermined pairs of said pendulums to and from said support and said rotatable wall without opening said chamber, and means for rotating the mounting means of preselected pendulums into alignment with said transporting means.

3. In an apparatus as defined in claim 2, the combination including means for removing said predetermined pair of pendulums from said transport mechanism onto said supporting means.

4. The combination of a vacuum sealed chamber, a group of pendulums, mounting means for each of said pendulums about a central point in said chamber, an optical flat centrally located within said chamber, means for selectively transporting various ones of said pendulums to and from said optical flat and said mounting means, means for rotating the mounting means of preselected pendulums into alignment with said transport means, means for receiving the pendulums from said transport mechanism and lowering said pendulums on said optical flat, and means for swinging said pendulums in order to take gravity measurements, each of said means being remotely operated without opening said chamber.

5. The combination of a vacuum sealed chamber, a series of pendulums mounted on supports located about a central point in said chamber, a support centrally located within said chamber upon which selected ones of said pendulums may be swung, means for selectively transporting various ones of said pendulums to and from said centrally located support and the supports located about said central point for said pendulums, means for rotating said supports located about said central point into alignment with said transport means, means for removing said pendulums from said transport means and lowering said pendulums on said centrally located support, and means for swinging said pendulums for gravity measurements, each of said means being operable externally of said chamber without breaking the vacuum in said chamber.

6. The combination defined in claim 5 including means for observing the period of said pendulums.

7. The combination defined in claim 5 including means for maintaining a constant temperature within said chamber.

8. In a gravity measuring apparatus the combination of a sealed case, a plurality of pendulums, means for mounting said pendulum for rotation around the inner periphery of said case, supporting means centrally located within said case upon which a pair of said pendulums may be simultaneously swung, externally operated means for transporting predetermined pairs of said pendulums to and from said supporting means and the periphery of said case, means for rotating the mounting means of preselected pendulums into alignment with said transporting means, externally operated means for lowering the pendulums from said transporting means to said supporting means, and externally operated means for setting predetermined pairs of said pendulums into oscillation on said supporting means, each of said externally operable means allowing for operation without opening said case.

References Cited by the Examiner

UNITED STATES PATENTS

| 1,858,384 | 5/32 | Andre | 73—382 |
| 2,610,507 | 9/52 | Boucher | 73—382 |
| 2,629,490 | 2/53 | Bailey | 73—382 |
| 2,973,107 | 2/61 | Cherel | 214—1 |

RICHARD C. QUEISSER, *Primary Examiner.*

DAVID SCHONBERG, *Examiner.*